UNITED STATES PATENT OFFICE 2,553,775

N-THIOTRICHLOROMETHYL AMIDES AND PARASITICIDAL COMPOSITIONS CONTAINING THEM

Roger S. Hawley, Linden, Allen R. Kittleson, Cranford, and Paul V. Smith, Jr., Westfield, N. J., assignors to Standard Oil Development Company, a corporation of Delaware No Drawing. Application June 21, 1949, Serial No. 100,542

16 Claims. (Cl. 167—22)

This invention relates to new and useful improvements in parasiticidal preparations and more particularly to improved fungicides, insecticides and germicides. This invention also relates to methods of protecting organic material subject to attack by low orders of organisms. This invention further relates to the synthesis of new chemical compounds, N-thiotrichloromethyl amides.

U. S. applications Serial No. 773,925, filed September 13, 1947, and Serial No. 90,271, filed April 28, 1949, disclose N-thiotrichloromethyl imides of dicarboxylic acids as active parasiticides.

It has now been found that a large number of organic compounds containing the >NSCCl₃ linked to one acyl group are extremely effective for checking the growth of bacteria, fungi, and insects. These new compounds may thus be used as novel ingredients of seed and plant protectants because of their disinfecting action on soil containing harmful organisms.

The physiologically active compounds of this invention may thus best be represented as having the >NSCCl₃ group in which the nitrogen is linked to one acyl group. The phrase acyl group refers to groups of the following character

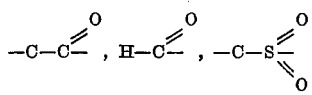

etc. (see Hackh, "Chemical Dictionary," Second Edition, page 21). The compounds of this invention may thus be considered broadly as amides, i. e., N-thiotrichloromethyl amides, and more specifically as substituted amides and sulfonamides.

Suitable amide compounds of the indicated type are thus illustrated in Formula I:

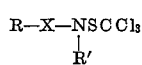

Formula I in which R represents an organic residue or an organic radical which is linked to the X group by a carbon atom, X is part of an acyl group such as for example

and

and R' represents and organic residue, an organic radical, or hydrogen radical. When R and R' are organic radicals, they may be the same or different and may also be aliphatic, aromatic, alicyclic, heterocyclic, and their substituted derivatives.

When R and R' are organic residues, they are usually different in nature and are linked together, forming a cyclic ring. The R' organic residue may contain a

group which is linked to the N atom. This is not an acyl type linkage, however, as the

group of the R' organic residue is linked to neither a carbon atom or a hydrogen atom as described above. Characteristically these compounds are substituted secondary amides of monobasic acids.

Suitable amide type compounds are thus illustrated more particularly below:

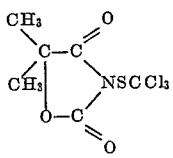

N-thiotrichloromethyl-5,5-dimethyloxazolidine-2,4-dione

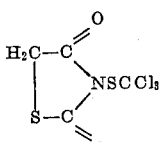

N-thiotrichloromethyl-2,4-dioxothiazolidine

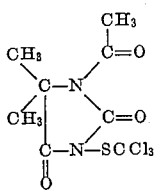

1-acetyl-3-thiotrichloromethyl-5,5-dimethylhydantoin

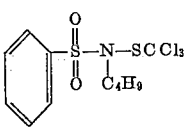

N-thiotrichloromethyl-N-butylbenzenesulfonamide

The novel N-thiotrichloromethyl amide compounds of this invention may be prepared in general by the reaction of perchloromethyl mercaptan (ClSCCl₃), with the corresponding amide or the metal salt of this compound. Formula II illustrates this reaction between phenyl benzene sulfonamide and perchloromethyl mercaptan, where M represents hydrogen or a metal.

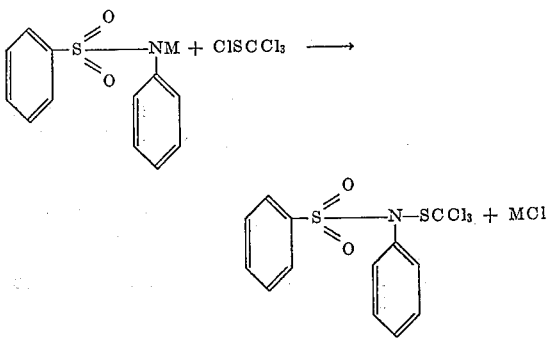

Formula II

The preparation of the amide starting materials and their metal salts is well known in the art and is not the subject of this invention, and therefore has not been here described.

When the amide salt is used as a starting material for the production of N-thiotrichloromethyl amide derivatives of this invention, the salt is first dispersed in an organic liquid such as benzene or dioxane and while stirring and heating to about 50°–80° C., an approximately equal molecular quantity of perchloromethyl mercaptan is added over a period of about 1 to 2 hours. The reaction is continued for about 3 to 4 hours after all the mercaptan has been added. After cooling, the reaction mixture is filtered to remove the metal halide and any unreacted amide salt and in some cases, a portion of the N-thiotrichloromethyl amide. The remainder of the N-thiotrichloromethyl amide is recovered by concentrating the solvent filtrate and recrystallizing the residue from a suitable solvent. Any N-thiotrichloromethyl amide in the original filter cake may be recovered by washing with water to remove the metal halide and unreacted amide salt. The water-insoluble product may then be further purified by recrystallization from a suitable solvent.

The compounds of this invention can also be prepared by the general method of dissolving the desired amide, without first forming the metal salt, in aqueous alkaline solution, followed by addition of about an equal molecular quantity of perchloromethyl mercaptan. The mixture is stirred rapidly, until the aqueous medium becomes acid to litmus, then filtered and air dried. An 85%–93% yield of N-thiotrichloromethyl amide of high purity is thus obtained. The reaction may be carried out at room temperature. In cases where the amide is readily hydrolyzed in alkaline solution, it may be advantageous to cool the reaction mixture as low as 0° C.

The metal compound used to supply the necessary alkaline solution is a compound of an alkali metal such as lithium, sodium and potassium, and the like. Because of cost factors, sodium and potassium are preferred. The alkali is present preferably in amounts equivalent to the amide used. While other basic compounds may be used, it is desirable to use the alkali hydroxides because of the consequent avoidance of the presence of other anion radicals which might have to be removed.

Variations on these procedures can be made, of course. Thus, the alkali metal amide salts, if available, can be dissolved directly in water and the process further carried on as indicated above for the aqueous solution reaction. The amides can also be dispersed directly in the organic media and finely divided alkali hydroxide or sodium added, thus forming the salt in situ. The process is then further carried on as described above.

The following examples are given to illustrate this invention and include both the preparation of the N-thiotrichloromethyl amide compounds by the indicated methods, and test results obtained on the activity of these organic compounds containing the >NSCCl₃ group.

EXAMPLE I

*Preparation of N-thiotrichloromethyl-5-methyl-5-ethyloxazolidine-2,4-dione*

Forty-eight grams, (0.3 mole) of 5-methyl-5-ethyloxazolidine-2,4-dione was charged to a 500 cc. Erlenmeyer flask equipped with a dropping funnel. Thirteen and one-half grams of sodium hydroxide dissolved in 300 cc. of water was added and the mixture stirred until solution was complete. The reaction mixture was cooled to 10° C. and while stirring rapidly, 62 grams (0.3 mole) of perchloromethyl mercaptan was added from the dropping funnel over a period of 10 minutes. The temperature of the reaction mixture was maintained at 10°–20° C. After 1¼ hours, the reaction was discontinued and the mixture filtered with suction. After air drying, 86 grams of white powder (89% yield) was recovered. The material was recrystallized from petroleum ether, giving 76 grams of white crystalline product having a melting point of 83°–84° C. The product is soluble in acetone, alcohol, carbon tetrachloride and benzene.

| Analysis | Per Cent C | Per Cent H | Per Cent S | Per Cent Cl |
|---|---|---|---|---|
| Found | 29.31 | 3.04 | 11.20 | 36.29 |
| Theory | 28.70 | 2.75 | 10.95 | 36.35 |

EXAMPLE II

*Preparation of N-thiotrichloromethyl-N-phenyl-benzenesulfonamide*

Forty-two grams (0.18 mole) of N-phenylbenzene-sulfonamide were dissolved in 200 cc. of water containing 7.2 grams sodium hydroxide. While stirring rapidly at room temperature, 33.5 (0.18 mole) grams of perchloromethyl mercaptan was added dropwise from a dropping funnel over a period of 15 minutes. After stirring for one hour the solution became acid. After filtering the precipitate and air drying the residue, the product was recrystallized from n-heptane. Recovered 64 grams of a tan-colored solid having a melting point of 106°–108° C. After recrystallizing from methyl alcohol, 42 grams of a light-colored crystalline material was obtained having a melting point of 111.5–112.5° C.

| Analysis | Per Cent C | Per Cent H | Per Cent S | Per Cent Cl |
|---|---|---|---|---|
| Found | 41.01 | 2.77 | 18.02 | 27.59 |
| Theory | 40.84 | 2.62 | 16.75 | 27.83 |

EXAMPLE III

*Preparation of 1-nitro-3-thiotrichloromethyl-5,5-dimethylhydantoin*

Fifty-eight grams (0.3 mole) of 1-nitro-5,5-dimethylhydantoin were dissolved in 350 cc. of cold water containing 13.3 grams sodium hydroxide in a 1-liter Erlenmeyer flask equipped with a stirrer and dropping funnel. While stirring rapidly, 62 grams (0.3 mole) of perchloromethyl mercaptan was added from the dropping funnel over a period of 10 minutes. The reaction temperature was maintained at 15°–20° C. After 1.5 hours, the reaction mixture was filtered with suction and the residue air dried. One hundred grams (93% yield) of a white solid was recovered. The product was soluble in acetone, alcohol, carbontetrachloride and benzene, but only slightly soluble in heptane.

| Analysis | Per Cent C | Per Cent H | Per Cent S | Per Cent Cl | Per Cent N |
|---|---|---|---|---|---|
| Found | 21.25 | 2.33 | 9.85 | 32.74 | 12.35 |
| Theory | 22.36 | 1.87 | 9.94 | 33.08 | 13.04 |

EXAMPLE IV

*Preparation of N-thiotrichloromethyl-2,4-dioxothiazolidine*

35.14 grams (0.3 mole) of 2,4-dioxothiazolidine was added to 500 cc. of water containing 12 grams of sodium hydroxide. While stirring rapidly, 55.8 grams (0.3 mole) of perchloromethylmercaptan was added dropwise from a dropping funnel. The temperature reaction was not allowed to go above 35° C. The solution became acid within 15 minutes. The product was filtered with suction and air dried. Recovered 68 grams (92% yield) of a crystalline product having a melting point of 111°–116° C.

| Analysis | Per Cent C | Per Cent H | Per Cent S | Per Cent Cl | Per Cent N |
|---|---|---|---|---|---|
| Found | 19.14 | 0.92 | 24.22 | 39.66 | 5.19 |
| Theory | 18.03 | 0.75 | 24.00 | 39.91 | 5.24 |

The compounds described in this invention may thus be applied to parent materials to retard or prevent fungus growth and mildew formation. Since many of these compounds are exceptionally nonphytotoxic, they may be applied safely to a wide variety of plants. Some of the additional parent materials to which they may be applied for protective purposes are leather, wood, fur, wool, coated fabrics, and other substances.

These compounds may be reduced to an impalpable powder and applied as an undiluted dust or mixed with a solid carrier, such as clay, talc and bentonite, as well as other carriers known in the art, in order to bring the compounds into intimate contact with the parasites (see Frear "Chemistry of Insecticides, Fungicides and Herbicides"). They may thus be applied as a spray in a liquid carrier, either as a solution in a solvent, or as a suspension in a non-solvent, such as water. When applied as a spray in water, it may be desirable to incorporate wetting agents.

The compounds of this invention in general are soluble in organic solvents such as acetone, ethyl alcohol, benzene, naphtha, etc., although different compounds exhibit different solubilities.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as the ricinoleic ester of sorbitol, and petroleum sulfonates of $C_{10}$ to $C_{20}$ length. The non-ionic emulsifying agents such as the ethylene oxide condensation products of alkylated phenols may also be used. It is to be understood that these and similar compounds are intended when the term wetting agent is used hereafter.

The compounds of this invention may also be admixed with carriers that are themselves active, such as other parasiticides, hormones, herbicides, fertilizers, and wetting agents. Stomach and contact insecticides such as the arsenates, fluorides, rotenone, and the various fish poisons and organic insecticides, such as di-(p-chlorophenyl)-trichloroethane, benzenehexachloride, and similar products may also be advantageously added.

EXAMPLE V

Compounds of this invention were tested for parasiticidal activity.

The values given in column I represent the percentage mortality of the test insects after 96 hours following a two-minute immersion in a 0.25% aqueous solution or suspension of the test compound.

The results in column II are given as per cent mortality of the test insect after 96 hours following bloodstream injection of 0.002 cc. of a 5% solution of the test compound.

The Slide Germination Technique for fungicidal testing was carried out as described by Wellman and McCallan (Contributions of Boyce Thompson Institute, vol. 3, No. 3, pages 171–176) and is listed in column III as concentration of test compound in per cent to give an LD–50.

| Compound | Column I — Contact Insecticidal Activity | | Column II — Bloodstream Insect. Activity, Periplanitus americana (American Roach) | | Column III — Fungicidal Inhibiting Concentration, Per Cent | |
|---|---|---|---|---|---|---|
|  | Blattella germanica (German Roach) | Omelpeltus sociatus (Milk Weed Bug) | Female | Male | Alterneria solania | Sclerotinia fructicola |
| N-thiotrichloromethyl-2,4-dioxothiazolidine | 10 | 5 | 60 | 100 | 0.001–0.0001 | 0.0001 |
| N-thiotrichloromethyl-5,5-dimethyloxazolidine-2,4-dione | 30 | 100 | 100 | 100 | 0.0001 | 0.0001 |
| N-thiotrichloromethyl-5-methyl-5-ethyloxazolidine-2,4-dione | 5 | 0 | 100 | 100 | 0.0001 | 0.0001 |
| N-thiotrichloromethyl-5,5-pentamethyleneoxazolidine-2,4-dione | 10 | 0 | 100 | 80 | 0.0001 | 0.0001 |
| N-thiotrichloromethyl-5-methyl-5-phenyloxazolidine-2,4-dione | 0 | 0 | 0 | 80 | 0.001–0.0001 | 0.001–0.0001 |
| N-thiotrichloromethyl-5-methyl-5-isobutyloxazolidine-2,4-dione | 0 | 5 | 80 | 100 | 0.001–0.0001 | 0.001–0.0001 |
| N-thiotrichloromethyl-5,5-dimethylhydantoin | 35 | 5 | 100 | 100 | 0.01–0.001 | 0.001–0.0001 |
| 1-nitro-3-thiotrichloromethyl-5,5-dimethylhydantoin | 15 | 0 | 60 | 80 | 0.001–0.0001 | 0.001–0.0001 |

| Compound | Column I Contact Insecticidal Activity | | Column II Bloodstream Insect. Activity, Periplanitus americana (American Roach) | | Column III Fungicidal Inhibiting Concentration, Per Cent | |
|---|---|---|---|---|---|---|
| | *Blattella germanica* (German Roach) | *Omelpeltus sociatus* (Milk Weed Bug) | Female | Male | *Alterneria solania* | *Sclerotinia fructicola* |
| 1-acetyl-3-thiotrichloromethyl-5,5-dimethylhydantoin | 45 | 100 | 40 | 100 | 0.001–0.0001 | 0.001–0.0001 |
| 3-thiotrichloromethyl-5-methyl-5-isobutylhydantoin | 20 | 10 | 100 | 100 | 0.01–0.001 | 0.001–0.0001 |
| N-thiotrichloromethyl-5-isooctyloxazolidine-2,4-dione | 55 | 20 | 60 | 80 | 0.01–0.001 | 0.01–0.001 |
| N-thiotrichloromethyl-5-methyl-5-cyclopropyloxazolidine-2,4-dione | 30 | 0 | 100 | 100 | 0.001–0.0001 | 0.001–0.0001 |
| N-thiotrichloromethyl-N-butyl-benzenesulfonamide | — | — | — | — | 0.1–0.01 | 0.01–0.001 |
| N-thiotrichloromethyl-N-phenyl-benzene-sulfonamide | 20 | 5 | 20 | 0 | 0.01–0.001 | 0.01–0.001 |

It is to be understood that the invention is not limited to the specific examples which have been offered merely as illustrations, since other derivatives can be prepared, and that modifications may be made without departing from the spirit of the invention.

What is claimed is:

1. As new chemical compounds, N-thiotrichloromethyl amides.
2. As new chemical compounds, N-thiotrichloromethyl oxazolidine-diones.
3. As new chemical compounds, N-thiotrichloromethyl-2,4-dioxo-thiazolidines.
4. As new chemical compounds, N-thiotrichloromethyl sulfonamides.
5. As new chemical compounds, N-thiotrichloromethylhydantoins.
6. As a new chemical compound, N-thiotrichloromethyl-5,5-dimethyloxazolidine-2,4-dione.
7. As a new chemical compound, 1-acetyl-3-thiotrichloromethyl-5,5-dimethylhydantoin.
8. As a new chemical compound, N-thiotrichloromethyl-N-butylbenzenesulfonamide.
9. A fungicidal composition containing an N-thiotrichloromethyl amide as an active ingredient admixed with a surface active dispersing agent which lowers the surface tension of water and thereby promotes aqueous colloidal dispersions of the amide.

10. A fungicidal composition comprising an N-thiotrichloromethyl amide as an active ingredient dissolved in a solvent therefor.

11. A fungicidal composition comprising an N-thiotrichloromethyl amide as an active ingredient admixed with a solid, powdered, inert diluent.

12. A fungicidal composition as in claim 11 in which the inert diluent is a clay.

13. A fungicidal composition as in claim 12 in which the clay is bentonite.

14. A fungicidal dust composition comprising an N-thiotrichloromethyl-hydantoin as an active ingredient admixed with bentonite.

15. A fungicidal dust composition comprising 1-acetyl-3-thiotrichloromethyl - 5, 5 dimethyl-dantoin as the active ingredient admixed with bentonite.

16. A fungicidal composition comprising as an active ingredient an N-thiotrichloromethyl amide contained in an aqueous emulsion with a wetting agent.

ROGER S. HAWLEY.
ALLEN R. KITTLESON.
PAUL V. SMITH, Jr.

No references cited.